United States Patent
Takahashi

(10) Patent No.: US 11,674,039 B2
(45) Date of Patent: Jun. 13, 2023

(54) POLYAMIDEIMIDE RESIN COMPOSITION AND FLOURINE-BASED COATING MATERIAL

(71) Applicant: HITACHI CHEMICAL COMPANY, LTD., Tokyo (JP)

(72) Inventor: Atsushi Takahashi, Hitachi (JP)

(73) Assignee: RESONAC CORPORATION, Tokyo (JP)

( * ) Notice: Subject to any disclaimer, the term of this patent is extended or adjusted under 35 U.S.C. 154(b) by 479 days.

(21) Appl. No.: 16/486,355

(22) PCT Filed: Feb. 20, 2017

(86) PCT No.: PCT/JP2017/006084
§ 371 (c)(1),
(2) Date: Aug. 15, 2019

(87) PCT Pub. No.: WO2018/150566
PCT Pub. Date: Aug. 23, 2018

(65) Prior Publication Data
US 2020/0239686 A1    Jul. 30, 2020

(51) Int. Cl.
C08G 73/14 (2006.01)
C08L 79/08 (2006.01)
C08G 73/10 (2006.01)
C09D 127/12 (2006.01)
C09D 179/08 (2006.01)

(52) U.S. Cl.
CPC .......... C08L 79/08 (2013.01); C08G 73/1032 (2013.01); C08G 73/1035 (2013.01); C09D 127/12 (2013.01); C09D 179/08 (2013.01)

(58) Field of Classification Search
CPC .... C09D 179/08; C08G 73/14; C08J 2379/08; C08J 2479/08; C08L 79/08
See application file for complete search history.

(56) References Cited

U.S. PATENT DOCUMENTS

2017/0349706 A1* 12/2017 Ben-Asher ......... C08G 73/1003
2017/0349713 A1* 12/2017 Ben-Asher ......... C08G 73/1003
2018/0187029 A1    7/2018 Sperindio et al.

FOREIGN PATENT DOCUMENTS

| JP | 3491624 | 1/2004 |
|---|---|---|
| JP | 2012-197339 | 10/2012 |
| JP | 2013-209960 | 10/2013 |
| JP | 2014-181332 | 9/2014 |
| JP | 2016-69498 | 5/2016 |
| WO | 2015/144663 | 10/2015 |
| WO | 2016/175099 | 11/2016 |
| WO | 2017/011250 | 1/2017 |

OTHER PUBLICATIONS

International Search Report dated Apr. 4, 2017 in International (PCT) Application No. PCT/JP2017/006084.

* cited by examiner

*Primary Examiner* — Gregory Listvoyb
(74) *Attorney, Agent, or Firm* — Wenderoth, Lind & Ponack, L.L.P.

(57) ABSTRACT

Disclosed are a polyamideimide resin composition comprising (A) a polyamideimide resin, (B) a 3-alkoxy-N,N-dimethylpropanamide, and (C) water; and a fluorine-based coating material comprising the polyamideimide resin composition and a fluororesin.

3 Claims, No Drawings

POLYAMIDEIMIDE RESIN COMPOSITION AND FLOURINE-BASED COATING MATERIAL

TECHNICAL FIELD

Embodiments of the present invention relate to a method for producing a polyamideimide resin composition, a fluorine-based coating material, and use of that coating material.

BACKGROUND ART

Polyamideimide resins exhibit excellent heat resistance, chemical resistance and solvent resistance, and are therefore widely used as coating agents for various substrates. For example, polyamideimide resins are used as varnishes for enameled wires and as heat-resistant coating materials.

N-methyl-2-pyrrolidone and the like are well known as the solvents generally used for dissolving, diluting and synthesizing these polyamideimide resins, and because these solvents are able to impart excellent solubility to polyamideimide resins, they have been widely used up until this point (see Patent Document 1).

Further, in recent years, for reasons including environmental preservation, safety and hygiene, economic viability and coating workability, aqueous resin solutions that use water as the solvent medium instead of an organic solvent are attracting attention. A method for converting a polyamideimide resin to a water-soluble form by reacting a basic compound with the residual carboxyl groups at the resin terminals has been reported (Patent Document 2), and is being used in a variety of applications.

PRIOR ART DOCUMENTS

Patent Documents

Patent Document 1: JP 2012-197339 A
Patent Document 2: JP 3491624 B

SUMMARY OF INVENTION

Problems Invention Aims to Solve

However, water is a considerably poor solvent for polyamideimide resins, and therefore a problem arises in that aqueous polyamideimide resin compositions tend to exhibit poor storage stability.

Accordingly, one embodiment of the present invention has an object of providing a polyamideimide resin composition (resin varnish) that provides excellent working environment properties, and also exhibits excellent storage stability.

Means for Solution of the Problems

The inventor of the present invention discovered that by using a 3-alkoxy-N,N-dimethylpropanamide as a solvent (synthesis solvent and coating material solvent), an aqueous polyamideimide resin composition (resin varnish) that provides excellent working environment properties and also exhibits excellent storage stability could be obtained, and completed the present invention.

One aspect of the present invention provides a polyamideimide resin composition comprising: (A) a polyamideimide resin, (B) a 3-alkoxy-N,N-dimethylpropanamide, and (C) water.

Another aspect provides a method for producing a polyamideimide resin that comprises polymerizing a diisocyanate compound and a tribasic acid anhydride and/or tribasic acid halide in an organic solvent containing a 3-alkoxy-N, N-dimethylpropanamide.

Another aspect provides a fluorine-based coating material comprising the polyamideimide resin composition of the embodiment described above, or a polyamideimide resin produced using the production method of the embodiment described above, and a fluororesin.

Yet another aspect provides a substrate or article having a coating film formed using the fluorine-based coating material of the embodiment described above on at least a portion of a surface of the substrate or article.

Effects of the Invention

One embodiment of the present invention is able to provide an aqueous polyamideimide resin composition that exhibits excellent storage stability and contains a solvent that provides excellent working environment properties. This polyamideimide resin composition can form a coating film having excellent adhesion, and is ideal as a binder for a fluorine-based coating material.

EMBODIMENTS FOR CARRYING OUT THE INVENTION

Preferred embodiments are described below, but the present invention is not limited to these embodiments.

1. Polyamideimide Resin Composition

The polyamideimide resin composition is an aqueous heat-resistant resin composition containing at least a polyamideimide resin, a 3-alkoxy-N,N-dimethylpropanamide and water. In this description, the terms "resin composition", "varnish" and "coating material" are sometimes used with the same meaning.

<Polyamideimide Resin>

The polyamideimide resin of the component (A) is a resin obtained by reacting a diisocyanate compound and a tribasic acid anhydride or tribasic acid halide as an acid component. An arbitrary combination of a plurality of compounds may also be used for each of these raw material compounds.

There are no particular limitations on the diisocyanate compound, and suitable examples include 4,4'-diphenylmethane diisocyanate, xylylene diisocyanate, 3,3'-diphenylmethane diisocyanate, 3,3'-dimethoxylbiphenyl-4,4-diisocyanate, para-phenylene diisocyanate, hexamethylene diisocyanate, tolylene diisocyanate, naphthalene diisocyanate and isophorone diisocyanate. From the viewpoint of reactivity, the use of 4,4'-diphenylmethane diisocyanate is preferred.

In one embodiment, the polyamideimide resin may be produced using a diamine compound in addition to the diisocyanate. Examples of the diamine compound include 4,4'-diaminodiphenylmethane, 4,4'-diaminodiphenyl ether, 4,4'-diaminodiphenylsulfone, 3,3'-diaminodiphenylsulfone, xylylenediamine, phenylenediamine and isophoronediamine.

Although there are no particular limitations on the tribasic acid anhydride, the use of an aromatic tribasic acid anhydride is preferred, and among such compounds, trimellitic anhydride is preferred. Similarly, there are no particular limitations on the tribasic acid halide, but tribasic acid chlorides, and particularly aromatic tribasic acid chlorides, are preferred, one example of which is trimellitic anhydride chloride (anhydrotrimellitic acid chloride). From the viewpoint of reducing environmental impact, the use of trimellitic anhydride or the like is preferred.

Besides the tribasic acid anhydride (or tribasic acid chloride) described above, other saturated or unsaturated polybasic acids such as dicarboxylic acids and tetracarboxylic dianhydrides may also be used as acid components, provided they do not impair the properties of the polyamideimide resin.

There are no particular limitations on the dicarboxylic acids, and examples include terephthalic acid, isophthalic acid, adipic acid and sebacic acid. There are also no particular limitations on the tetracarboxylic dianhydrides, and examples include pyromellitic dianhydride, benzophenone tetracarboxylic dianhydride and biphenyl tetracarboxylic dianhydride. These compounds may be used individually, or an arbitrary combination of a plurality of compounds may be used.

From the viewpoint of maintaining the properties of the polyamideimide resin, the total amount of carboxylic acids (dicarboxylic acids and tetracarboxylic acids) other than the tribasic acid is preferably within a range from 0 to 50 mol %, and more preferably within a range from 0 to 30 mol %, of all the carboxylic acids.

From the viewpoint of the molecular weight and the crosslinking degree of the produced polyamideimide resin, the usage ratio between the diisocyanate (and diamine) and the acid component (the total of the tribasic acid anhydride or tribasic acid halide, and any dicarboxylic acids and tetracarboxylic dianhydrides that are used as required) is set so that for 1.0 mol of the total of all the acid components, the amount of the diisocyanate compound (and diamine compound) is preferably at least 0.8 mol, more preferably at least 0.95 mol, and even more preferably 1.0 mol or greater, but is preferably not more than 1.1 mol, and more preferably 1.08 mol or less.

From the viewpoint of ensuring favorable coating film strength, the number average molecular weight of the polyamideimide resin is preferably at least 5,000, more preferably at least 10,000, and even more preferably 15,000 or greater. On the other hand, in order to ensure satisfactory solubility in water, the number average molecular weight is preferably not more than 50,000, more preferably not more than 30,000, and even more preferably 25,000 or less.

The number average molecular weight of the polyamideimide resin can be controlled within the above preferred range by performing sampling during the resin synthesis, measuring the number average molecular weight with a gel permeation chromatograph (GPC) using a calibration curve prepared using standard polystyrenes, and continuing the synthesis until the targeted number average molecular weight has been achieved. The GPC measurement conditions are described below.

The polyamideimide resin preferably has an acid value, composed of a combination of the carboxyl groups in the resin and other carboxyl groups formed as a result of ring-opening of acid anhydride groups, that is within a range from 10 to 80 mgKOH/g. Provided this acid value is at least 10 mgKOH/g, dissolution or dispersion of the resin in the solvent becomes easier, and the amount of carboxyl groups is sufficient for reaction with a basic compound, meaning the resin tends to be more easily converted to a water-soluble form. On the other hand, provided the acid value is not more than 80 mgKOH/g, the final polyamideimide resin composition tends to be less likely to gel upon storage. From these viewpoints, the acid value is more preferably at least 25 mgKOH/g, but is preferably not more than 60 mgKOH/g, and more preferably 40 mgKOH/g or less.

The acid value can be obtained using the following method. First, about 0.5 g of the polyamideimide resin composition is sampled, about 0.15 g of 1,4-diazabicyclo [2.2.2]octane is added to the sample, about 60 g of N-methyl-2-pyrrolidone and about 1 mL of ion-exchanged water are then added, and the resulting mixture is stirred until the polyamideimide resin dissolves completely. This solution is then titrated against a 0.05 mol/L ethanolic potassium hydroxide solution using a potentiometric titrator to obtain the acid value for the polyamideimide resin, representing the combination of carboxyl groups and those carboxyl groups formed as a result of ring-opening of acid anhydride groups.

The amount of the polyamideimide resin in the composition may be set appropriately in accordance with the intended application, and although there are no particular limitations, from the viewpoint of achieving balance with the other components, in one preferred embodiment, the amount of the polyamideimide resin within the composition is preferably at least 5% by mass, more preferably at least 10% by mass, and even more preferably 15% by mass or greater, but is preferably not more than 50% by mass, more preferably not more than 40% by mass, and even more preferably 30% by mass or less.

3-alkoxy-N,N-dimethylpropanamide

The polyamideimide resin composition contains a 3-alkoxy-N,N-dimethylpropanamide ($N(CH_3)_2COCH_2CH_2OR$, wherein R represents an alkyl group) of the component (B) as an organic solvent that exhibits excellent working environment properties. Although there are no particular limitations on the alkoxy group (RO group), from the viewpoint of the solubility of the polyamideimide, an alkoxy group containing a lower alkyl group of such as 1 to 6 carbon atoms is preferred, and more specifically, a methoxy group, ethoxy group, propoxy group or butoxy group is more preferred. Among the various possibilities, the component (B) preferably contains 3-methoxy-N,N-dimethylpropanamide ($N(CH_3)_2COCH_2CH_2OCF_3$).

The polyamideimide resin composition preferably contains mainly the 3-alkoxy-N,N-dimethylpropanamide, but may also contain one or more other organic solvents. Examples of these other organic solvents include one or more polar solvents selected from among N-methyl-2-pyrrolidone, N-ethyl-2-pyrrolidone, γ-butyrolactone, dimethyl sulfoxide, 1,3-dimethyl-2-imidazolidine, dimethylacetamide, dimethylformamide, N-formylmorpholine, and N-acetylmorpholine and the like. In addition, one or more co-solvents may also be used, including ether compounds such as anisole, diethyl ether and ethylene glycol; ketone compounds such as acetophenone, methyl ethyl ketone, methyl isobutyl ketone, cyclohexanone and cyclopentanone; aromatic hydrocarbon solvents such as xylene and toluene; and alcohols such as ethanol and 2-propanol.

From the viewpoint of the miscibility with water, the amount of the 3-alkoxy-N,N-dimethylpropanamide, or the organic mixed solvent containing the 3-alkoxy-N,N-dimethylpropanamide, is preferably not more than 90% by mass, and more preferably 80% by mass or less, of the total mass of the organic solvent and water (namely, the total solvent). In the case of an organic mixed solvent, from the viewpoint of satisfactorily achieving the effects of the preferred embodiments, the amount of the 3-alkoxy-N,N-dimethylpropanamide within the mixed organic solvent is preferably at least 50% by mass, and in order of increasing preference, is more preferably at least 60% by mass, at least 70% by mass, at least 80% by mass, or 90% by mass or more.
<Water>

The polyamideimide resin composition also contains the water of the component (C). Ion-exchanged water can be used favorably as the water.

From the viewpoint of improving the solubility of the polyamideimide resin in the water, the amount of water in the composition is preferably at least 10% by mass, more preferably at least 15% by mass, and even more preferably at least 25% by mass, but on the other hand, the amount of water in the composition is preferably not more than 80% by mass, more preferably not more than 70% by mass, and even more preferably 60% by mass or less. Further, relative to the total mass of the organic solvent containing the 3-alkoxy-N,N-dimethylpropanamide and the water, namely relative to the total mass of all solvent in the composition, the amount of water is preferably at least 10% by mass (a relative to solvent ratio of at least 10% by mass), more preferably at least 20% by mass, and even more preferably at least 25% by mass, but on the other hand, the water relative to solvent ratio (the proportion of water within the total solvent) is preferably not more than 90% by mass, more preferably not more than 70% by mass, and even more preferably 50% by mass or lower.

<Other Components>

In addition to the components (A) to (C) described above, the polyamideimide resin composition according to one embodiment may also contain one or more optional components in accordance with the intended use.

In a preferred embodiment, in order to enhance the solubility of the polyamideimide resin in water, the composition also contains a basic compound. The basic compound enhances the solubility of the resin in water by reacting with the carboxyl groups in the polyamideimide resin to form salts.

Examples of Suitable Basic Compounds Include:

alkylamines such as triethylamine, tributylamine, N,N-dimethylcyclohexylamine, N,N-dimethylbenzylamine, triethylenediamine, N-methylmorpholine, N,N,N',N'-tetramethylethylenediamine, N,N,N',N",N"-pentamethyldiethylenetriamine, N,N',N'-trimethylaminoethylpiperazine, diethylamine, diisopropylamine, dibutylamine, ethylamine, isopropylamine and butylamine; and alkanolamines such as monoethanolamine, diethanolamine, triethanolamine, dipropanolamine, tripropanolamine, N-ethylethanolamine, N,N-dimethylethanolamine, N,N-diethylethanolamine, cyclohexanolamine, N-methylcyclohexanolamine and N-benzylethanolamine.

Besides the basic compounds mentioned above, caustic alkalis such as sodium hydroxide and potassium hydroxide, or ammonia water or the like may also be used in combination with the above basic compounds.

From the viewpoints of facilitating the conversion of the resin to a water-soluble form and improving the coating film strength, the basic compound is preferably used in an amount of 2.5 to 10 equivalents, and more preferably at least 4 equivalents but not more than 8 equivalents, relative to the acid value composed of the combination of carboxyl groups and ring-opened acid anhydride groups contained within the polyamideimide resin.

The salt formation between the polyamideimide resin and the basic compound may be achieved by adding the basic compound to the polyamideimide resin composition containing water, or by adding the basic compound to an organic solvent solution of the polyamideimide resin that contains no water, and subsequently adding water. The temperature during salt formation is preferably within a range from 0° C. to 200° C., and more preferably from 40° C. to 130° C.

The polyamideimide resin composition can be used favorably as a coating material and when the composition is used as a coating material, optional components such as pigments, fillers, antifoaming agents, preservatives and surfactants may be added as required. Resins other than the polyamideimide resin may also be included, and details of such resins are disclosed below in the section relating to the coating material.

Moreover, an optional blocking agent may be added to the polyamideimide resin composition to block the terminal isocyanate groups or the like of the polyamideimide resin. There are no particular limitations on the blocking agent used for the isocyanate groups, but the use of an alcohol, oxime, or lactam or the like is preferred.

2. Method for Producing Polyamideimide Resin

The method for producing a polyamideimide resin includes:

polymerizing a diisocyanate compound and a tribasic acid anhydride and/or tribasic acid halide in an organic solvent containing a 3-alkoxy-N,N-dimethylpropanamide.

The raw material compounds used are as described above in the section relating to the polyamideimide resin.

In the polymerization reaction, the 3-alkoxy-N,N-dimethylpropanamide or the organic solvent containing the 3-alkoxy-N,N-dimethylpropanamide can be used as the polymerization solvent (the synthesis solvent), and in such cases, the obtained resin solution can be used without further modification as a polyamideimide resin composition component in a coating material or the like. In other words, the 3-alkoxy-N,N-dimethylpropanamide may be used as both the synthesis solvent and the solvent for the coating material described below. Examples of other organic solvents besides the 3-alkoxy-N,N-dimethylpropanamide that can be used favorably in the polymerization reaction include the solvents described above as polar solvents in the section relating to the polyamideimide resin composition.

Although there are no particular limitations on the amount of solvent used during the polymerization, using an amount of solvent of 50 to 500 parts by mass per 100 parts by mass of the total mass of the diisocyanate component (and diamine component) and the acid component is preferred from the viewpoint of the solubility of the resin.

Although there are no particular limitations on the reaction temperature, a temperature of 80 to 180° C. is generally preferred.

In order to reduce the effect of moisture in the air, the polymerization reaction is preferably conducted under an atmosphere of nitrogen or the like.

The polyamideimide resin can be produced, for example, using any of the following procedures.

(1) A method of synthesizing the polyamideimide resin by using and reacting the acid component and the diisocyanate component (and diamine component) in a single batch.

(2) A method of reacting the acid component with an excess of the diisocyanate component (and diamine component) to synthesize an amideimide oligomer having isocyanate groups or amino groups at the terminals, and then synthesizing the polyamideimide resin by adding additional acid component to react with the terminal isocyanate groups (and amino groups).

(3) A method of reacting an excess of the acid component with the diisocyanate component (and diamine component) to synthesize an amideimide oligomer having acid groups or acid anhydride groups at the terminals, and then synthesizing the polyamideimide resin by adding additional diisocyanate component and/or diamine component to react with the terminal acid groups and/or acid anhydride groups.

In those cases where the terminal groups of the polyamideimide resin are to be blocked, the blocking agent may be reacted during the synthesis of the resin, so that the above polymerization and the blocking occur simultaneously, or the blocking agent may be reacted with the resin following polymerization. In the former case, the blocking agent may be added to the polymerization solvent.

If the total amount of diisocyanate used during the resin production is deemed to be 100 parts by mass, then the amount of the terminal blocking agent added for blocking is preferably from 1.0 to 10.0 parts by mass, and from the viewpoint of the storage stability of the obtained resin composition, is more preferably from 2.5 to 5.0 parts by mass.

3. Method for Producing Polyamideimide Resin Composition

The polyamideimide resin composition of one embodiment, containing (A) the polyamideimide resin, (B) the 3-alkoxy-N,N-dimethylpropanamide and (C) water as described above, can be produced favorably by adding water to the reaction solution containing a polyamideimide resin obtained using the above method for producing a polyamideimide resin.

In other words, the method for producing a polyamideimide resin composition preferably includes:

polymerizing a diisocyanate compound and a tribasic acid anhydride and/or tribasic acid halide in an organic solvent containing a 3-alkoxy-N,N-dimethylpropanamide, and adding water to the obtained resin solution.

4. Coating Material

The polyamideimide resin composition can be diluted with water to an arbitrary concentration, and can form a coating film that exhibits excellent adhesion to substrates even after high-temperature baking, and can therefore be used favorably as a coating material. When the polyamideimide resin composition is used as a coating material, the composition is preferably diluted with water or an organic solvent to obtain a viscosity that is appropriate for the coating film formation method or the like. In one preferred embodiment, the coating material is an aqueous coating material containing water and a polyamideimide resin produced using the method for producing a polyamideimide resin according to the embodiment described above.

Further, because this polyamideimide resin composition also exhibits excellent miscibility with fluororesin water dispersions, it can be used favorably as a fluororesin binder. In other words, the polyamideimide resin composition can be used favorably as a fluorine-based coating material into which a fluororesin has been mixed.

A fluorine-based coating material containing a fluororesin and either the polyamideimide resin composition of an embodiment described above or a polyamideimide resin obtained using the above method for producing a polyamideimide resin exhibits excellent coating film adhesion, heat resistance and hardness, and is therefore ideal as a coating material for household electrical appliances or kitchen utensils. In a preferred embodiment, the coating material is an aqueous fluorine-based coating material containing water, a fluororesin, and a polyamideimide resin produced using the method for producing a polyamideimide resin according to the embodiment described above.

This fluorine-based coating material designed for household electrical appliances or kitchen utensils is composed of a mixed system containing a fluororesin that generates non-tacky properties, and a polyamideimide resin that generates good adhesion to substrates, and in order to ensure that the fluororesin orients toward the coating film surface during coating film baking, high-temperature baking at a temperature in the vicinity of 400° C. is performed to melt the fluororesin.

The polyamideimide resin described above is preferably contained within the coating material in an amount of 1 to 50% by mass in order to ensure satisfactory manifestation of the resin functions. A combination of a plurality of different types of polyamideimide resins, obtained by using different raw materials and/or by applying different polymerization conditions or the like, may also be used.

<Fluororesin>

The properties required of the mixed fluororesin include non-tackiness, corrosion resistance, heat resistance and chemical resistance, and examples of fluororesins that can be used favorably include mainly tetrafluoroethylene resins, tetrafluoroethylene-perfluoro vinyl ether copolymers, and tetrafluoroethylene-hexafluoropropylene copolymers. A combination of a plurality of these resins may also be used.

There are no particular limitations on the form of the fluororesin, and either an aqueous dispersion or a powder may be used. Although there are no particular limitations on the amount added of the fluororesin, in order to obtain a coating film having a good balance between superior adhesion and non-tackiness, for example, the amount of the fluororesin is preferably from 50 to 800 parts by mass, and more preferably from 100 to 500 parts by mass, per 100 parts by mass of the polyamideimide resin.

<Other Components>

If necessary, the coating material or the fluorine-based coating material may also use polyethersulfone resins (PES), polyimide resins (PI), polyamide resins, epoxy compounds, isocyanate compounds, or melamine compounds or the like, either individually or in mixtures.

In one preferred embodiment, the coating material may comprise an epoxy compound (epoxy resin). By adding an epoxy compound, the thermal, mechanical and electrical properties of the polyamideimide resin can be further improved. Further, epoxy compounds (epoxy resins), melamine compounds (melamine resins) and isocyanate compounds are preferred, as they enable further improvement in the adhesion of the coating film.

Examples of the epoxy compounds include bisphenol epoxy resins (such as bisphenol-A epoxy resins, hydrogenated bisphenol-A epoxy resins, bisphenol-F epoxy resins, brominated bisphenol-A epoxy resins, and bisphenol-S epoxy resins), biphenyl epoxy resins, phenol novolac epoxy resins, brominated phenol novolac epoxy resins, o-cresol novolac epoxy resins, flexible epoxy resins, polyfunctional epoxy resins, amine epoxy resins, heterocyclic ring-containing epoxy resins, alicyclic epoxy resins, triglycidyl isocyanurate, and bixylenol epoxy resins. These epoxy compounds may be used individually, or a combination of a plurality of compounds may be used.

The epoxy compound may be added alone and reacted with the polyamideimide resin, but the epoxy compound may also be added together with a curing agent or a curing accelerator or the like so that residual unreacted epoxy compound after curing decreases.

Examples of the isocyanate compounds include polyisocyanates of hexamethylene diisocyanate such as Duranate, and polyisocyanates synthesized from 4,4'-diphenylmethane diisocyanate. The mass average molecular weight of these polyisocyanates is preferably from 500 to 9,000, and more preferably from 1,000 to 5,000.

There are no particular limitations on the melamine compounds, and examples include methylol group-containing compounds obtained by reacting melamine with formaldehyde or para-formaldehyde or the like. These methylol groups are preferably etherified with an alcohol having 1 to 6 carbon atoms.

In terms of the amount of these epoxy compounds, isocyanate compounds and melamine compounds contained in the coating material, the amount of each of these compounds per 100 parts by mass of the polyamideimide resin is preferably at least 1 part by mass, and more preferably at least 5 parts by mass in terms of achieving a satisfactory improvement in the adhesion, but is preferably not more than 40 parts by mass, and more preferably 30 parts by mass or less from the viewpoint of maintaining the heat resistance and strength of the polyamideimide resin composition.

The coating material preferably also includes a surfactant depending on need. Although there are no particular limitations on the surfactant, a surfactant which ensures that the coating material composition mixes uniformly and does not undergo layer separation or phase separation before the coating film dries, and which does not leave a large amount of residual matter following baking of the coating film, is preferred.

Although there are no particular limitations on the amount of the surfactant, in order to maintain a uniform mixed state for the coating material composition, and ensure that a large amount of residual surfactant is not retained after baking, adversely affecting the film formation properties, the amount of the surfactant is preferably from 0.01 to 10% by mass, and more preferably from 0.5 to 5% by mass, of the coating material.

In order to improve the water resistance and the like of the coating film, the coating material may also contain a filler. The type of filler used can be selected in accordance with the intended application of the coating film, with consideration of factors such as the water resistance and the chemical resistance of the filler, and is preferably a filler that does not dissolve in water. Specific examples of the filler include metal powders, metal oxides (such as aluminum oxide, zinc oxide, tin oxide and titanium oxide), glass beads, glass flakes, glass particles, ceramics, silicon carbide, silicon oxide, calcium fluoride, carbon black, graphite, mica and barium sulfate. Any of these fillers may be used individually, or a combination of a plurality of fillers may be used.

There are no particular limitations on the coating method used for the coating material, and conventional coating methods such as dip coating, spray coating and brush application can be employed. The volume of solvent is preferably adjusted appropriately, with the concentration diluted to a level that is appropriate for the coating method.

Following application of the coating material, the material is dried (preliminary drying) and cured (baked) to form a coating film. The conditions for the drying and curing are not particularly limited, and are preferably set appropriately in accordance with the heat resistance of the substrate being used. In order to ensure favorable adhesion and toughness for the coating film, heating is preferably performed at 250° C. or higher. In the case of a fluorine-based coating material, in order to ensure that the fluororesin orients toward the coating film surface during coating film baking, high-temperature baking at a temperature in the vicinity of 400° C. is preferably conducted to melt the fluororesin, and performing the baking at a temperature of 330° C. to 420° C. for a period of about 10 minutes to 30 minutes is preferred. As a result of the baking, the fluororesin migrates toward the coating film surface, and melts to form a film.

5. Substrate or Article

A substrate or article of an embodiment of the present invention has a coating film formed from the above fluorine-based coating material on at least a portion of a surface of the substrate or article.

The coating film can be formed on the surface of any type of substrate or article which requires good safety properties and boiling resistance and the like for the coating film. The surface on which the coating film is formed is preferably a surface that is exposed to water vapor and/or a surface that is exposed to high temperatures.

Examples of the article include household electrical cooking appliances and kitchen utensils. Examples of the kitchen utensils include utensils for which there is a possibility of contact with boiling water or steam, such as pots, pressure cookers and fry pans, and more specifically, pots, pressure cookers and fry pans having the coating film described above formed on the inside surface, and lids for these utensils. Further, specific examples of the household electrical cooking appliances (kitchen electrical appliances) include rice cookers, hot plates, electric kettles, microwave ovens, oven ranges and gas ranges, and more specifically, inner pots and lids of rice cookers having the coating film described above formed on the inside surfaces thereof, microwave ovens having the coating film formed on the interior surface of the oven, and the top plates of gas ranges having the coating film formed on the surface.

The substrate is preferably a substrate that is used in these types of household electrical cooking appliances and kitchen utensils.

The polyamideimide resin composition according to an embodiment of the present invention, and a coating material (including a fluorine-based coating material) containing this polyamideimide resin as a coating film component have excellent working environment properties and storage stability, and when applied to a target article and then cured, are able to form a coating film which, compared with conventional coating films, exhibits excellent adhesion to the substrate and excellent steam resistance even after high-temperature baking. Accordingly, the present invention has enormous benefits in a large variety of applications that require safety, boiling resistance or steam resistance, and heat resistance for surface coating films, including household electrical appliances and cooking utensils.

In addition, because this polyamideimide resin composition is an aqueous resin composition, the environmental impact can be reduced, and a contribution can also be made to VOC reduction.

Although the above description has provided detailed descriptions of coating materials and fluorine-based coating materials, the polyamideimide resin composition can also be mixed with other resin materials or the like, and used to produce molded items by molding methods such as extrusion molding.

Preferred embodiments (1) to (8) are described below, but embodiments of the present invention are not limited to these embodiments.

(1) A polyamideimide resin composition comprising: (A) a polyamideimide resin, (B) a 3-alkoxy-N,N-dimethylpropanamide, and (C) water.

(2) The polyamideimide resin composition according to (1) above, wherein the number average molecular weight of the polyamideimide resin (A) is within a range from 5,000 to 50,000.

(3) The polyamideimide resin composition according to (1) or (2) above, wherein the acid value of the polyamideimide resin (A), composed of a combination of carboxyl groups and other carboxyl groups formed as a result of ring-opening of acid anhydride groups, is within a range from 10 to 80 mgKOH/g.

(4) The polyamideimide resin composition according to any one of (1) to (3) above, wherein the amount of the water (C) is at least 10% by mass of the composition.

(5) A method for producing a polyamideimide resin that comprises: polymerizing a diisocyanate compound and a tribasic acid anhydride and/or tribasic acid halide in an organic solvent comprising a 3-alkoxy-N,N-dimethylpropanamide.

(6) A fluorine-based coating material comprising the polyamideimide resin composition according to any one of (1) to (4) above, or a polyamideimide resin produced using the production method according to (5) above, and a fluororesin.

(7) A substrate having a coating film formed using the fluorine-based coating material according to (6) above on at least a portion of a surface of the substrate.

(8) An article having a coating film formed using the fluorine-based coating material according to (6) above on at least a portion of a surface of the article.

EXAMPLES

A variety of examples are described below, but the preferred embodiments of the invention are not limited to these examples, and of course also incorporate many embodiments other than these examples based on the scope of the present invention.

Example 1

A flask fitted with a thermometer, a stirrer and a condenser was charged with 345.8 g of trimellitic anhydride, 450.5 g of 4,4'-diphenylmethane diisocyanate and 897.9 g of 3-methoxy-N,N-dimethylpropanamide, and the resulting mixture was stirred under a stream of dry nitrogen while the temperature was gradually raised to 120° C. over a period of two hours. The temperature was then held at 120° C. while particular care was taken over the rapid foaming of carbon dioxide gas that was generated by the reaction, and after continued heating at this temperature for 6 hours, the reaction was halted, thus obtaining a polyamideimide resin solution.

The non-volatile fraction (200° C., 2 hours) of this polyamideimide resin solution was 45% by mass. Further, the number average molecular weight of the polyamideimide resin was 15,000, and the acid value composed of a combination of carboxyl groups and other carboxyl groups formed as a result of ring-opening of acid anhydride groups was 45 mgKOH/g.

The number average molecular weight of the polyamideimide resin was measured under the following conditions.
GPC apparatus: Hitachi L6000
Detector: Hitachi L4000 UV
Wavelength: 270 nm
Data processing unit: ATT 8
Columns: Gelpack GL-S300MDT-5×2
Column size: 8 mmø×300 mm
Solvent: DMF/THF=1/1 (liter)+0.06 M phosphoric acid+ 0.06 M lithium bromide
Sample concentration: 5 mg/ml
Injection volume: 5 μl
Pressure: 49 kgf/cm$^2$ (4.8×10$^6$ Pa)
Flow rate: 1.0 ml/min Subsequently, 1,200 g of the thus obtained polyamideimide resin solution was placed in a flask fitted with a thermometer, a stirrer and a condenser, and the solution was stirred under a stream of dry nitrogen while the temperature was gradually raised to 70° C. When the temperature reached 70° C., 154.4 g (4 equivalents) of N,N-dimethylethanolamine was added, and following thorough stirring with the temperature maintained at 70° C., ion-exchanged water was added gradually to the flask under constant stirring. The ion-exchanged water was added until a final total of 660.0 g of water (relative to solvent ratio: 50% by mass) had been added, thus obtaining a transparent and uniform polyamideimide resin composition (aqueous heat-resistant resin composition).

Example 2

A flask fitted with a thermometer, a stirrer and a condenser was charged with 153.7 g of trimellitic anhydride, 100.1 g of 4,4'-diphenylmethane diisocyanate, 105.7 g of 3,3'-dimethoxybiphenyl-4,4'-diisocyanate and 439.4 g of 3-methoxy-N,N-dimethylpropanamide, and the resulting mixture was stirred under a stream of dry nitrogen while the temperature was gradually raised to 90° C. over a period of one hour. The temperature was then held at 90° C. while particular care was taken over the rapid foaming of carbon dioxide gas that was generated by the reaction, and after continued heating for 8 hours from the start of the temperature raising process, the reaction was halted, thus obtaining a polyamideimide resin solution.

The non-volatile fraction (200° C., 2 hours) of this polyamideimide resin solution was 43% by mass. Further, the number average molecular weight of the polyamideimide resin was 10,000, and the acid value composed of a combination of carboxyl groups and other carboxyl groups formed as a result of ring-opening of acid anhydride groups was 50 mgKOH/g.

Subsequently, 500 g of the thus obtained polyamideimide resin solution was placed in a flask fitted with a thermometer, a stirrer and a condenser, and the solution was stirred under a stream of dry nitrogen while the temperature was gradually raised to 80° C. When the temperature reached 80° C., 76.9 g (4.5 equivalents) of N,N-dimethylethanolamine was added, and following thorough stirring with the temperature maintained at 80° C., ion-exchanged water was added gradually to the flask under constant stirring. The ion-exchanged water was added until a final total of 190.0 g of water (relative to solvent ratio: 40% by mass) had been added, thus obtaining a transparent and uniform polyamideimide resin composition (aqueous heat-resistant resin composition).

Example 3

A flask fitted with a thermometer, a stirrer and a condenser was charged with 499.5 g of trimellitic anhydride, 650.7 g of 4,4'-diphenylmethane diisocyanate and 1,405.8 g of 3-methoxy-N,N-dimethylpropanamide, and the resulting mixture was stirred under a stream of dry nitrogen while the temperature was gradually raised to 120° C. over a period of one hour. The temperature was then raised to 140° C. while particular care was taken over the rapid foaming of carbon dioxide gas that was generated by the reaction, and after continued heating for 5 hours from the start of the temperature raising process, the reaction was halted, thus obtaining a polyamideimide resin solution.

The non-volatile fraction (200° C., 2 hours) of this polyamideimide resin solution was 42% by mass. Further, the number average molecular weight of the polyamideimide resin was 25,000, and the acid value composed of a combination of carboxyl groups and other carboxyl groups formed as a result of ring-opening of acid anhydride groups was 25 mgKOH/g.

Subsequently, 2,000 g of the thus obtained polyamideimide resin solution was placed in a flask fitted with a thermometer, a stirrer and a condenser, and the solution was stirred under a stream of dry nitrogen while the temperature was gradually raised to 60° C. When the temperature reached 60° C., 266.9 g (8 equivalents) of N,N-dimethylethanolamine was added, and following thorough stirring with the temperature maintained at 60° C., ion-exchanged water was added gradually to the flask under constant stirring. The ion-exchanged water was added until a final total of 624.6 g of water (relative to solvent ratio: 35% by mass) had been added, thus obtaining a transparent and uniform polyamideimide resin composition (aqueous heat-resistant resin composition).

Comparative Example 1

A flask fitted with a thermometer, a stirrer and a condenser was charged with 1,106.2 g of trimellitic anhydride, 1,455.8 g of 4,4-diphenylmethane diisocyanate and 2,562.0 g of N-formylmorpholine, and the resulting mixture was stirred under a stream of dry nitrogen while the temperature was gradually raised to 130° C. over a period of two hours. The temperature was then held at 130° C. while particular care was taken over the rapid foaming of carbon dioxide gas that was generated by the reaction, and after continued heating at this temperature for 6 hours, the reaction was halted, thus obtaining a polyamideimide resin solution.

The non-volatile fraction (200° C., 2 hours) of this polyamideimide resin solution was 50% by mass. Further, the number average molecular weight of the polyamideimide resin was 17,000, and the acid value composed of a combination of carboxyl groups and other carboxyl groups formed as a result of ring-opening of acid anhydride groups was 40 mgKOH/g.

Subsequently, 2,700 g of this polyamideimide resin solution was placed in a flask fitted with a thermometer, a stirrer and a condenser, and the solution was stirred under a stream of dry nitrogen while the temperature was gradually raised to 50° C. When the temperature reached 50° C., 343.2 g (4 equivalents) of N,N-dimethylethanolamine was added, and following thorough stirring with the temperature maintained at 50° C., ion-exchanged water was added gradually to the flask under constant stirring. The ion-exchanged water was added until a final total of 1,350.0 g of water (relative to solvent ratio: 50% by mass) had been added, thus obtaining a transparent and uniform polyamideimide resin composition (aqueous heat-resistant resin composition).

Comparative Example 2

A flask fitted with a thermometer, a stirrer and a condenser was charged with 288.2 g of trimellitic anhydride, 375.4 g of 4,4-diphenylmethane diisocyanate and 995.4 g of γ-butyrolactone, and the resulting mixture was stirred under a stream of dry nitrogen while the temperature was gradually raised to 150° C. over a period of two hours. The temperature was then held at 150° C. while particular care was taken over the rapid foaming of carbon dioxide gas that was generated by the reaction, and after continued heating at this temperature for 4 hours, the reaction was halted, thus obtaining a polyamideimide resin solution.

The non-volatile fraction (200° C., 2 hours) of this polyamideimide resin solution was 38% by mass. Further, the number average molecular weight of the polyamideimide resin was 8,000, and the acid value composed of a combination of carboxyl groups and other carboxyl groups formed as a result of ring-opening of acid anhydride groups was 60 mgKOH/g.

Subsequently, 1,100 g of the thus obtained polyamideimide resin solution was placed in a flask fitted with a thermometer, a stirrer and a condenser, and the solution was stirred under a stream of dry nitrogen while the temperature was gradually raised to 50° C. When the temperature reached 50° C., 159.4 g (4 equivalents) of N,N-dimethylethanolamine was added, and following thorough stirring with the temperature maintained at 50° C., ion-exchanged water was added gradually to the flask under constant stirring. The ion-exchanged water was added until a final total of 292.3 g of water (relative to solvent ratio: 30% by mass) had been added, thus obtaining a transparent and uniform polyamideimide resin composition (aqueous heat-resistant resin composition).

<Evaluations>

Each of the polyamideimide resin compositions (varnishes) obtained in the above examples and comparative examples was stored in an environment at 60° C., and the external appearance of the varnish was inspected after 7 days.

Further, each of the resin compositions (test coating materials) was applied to an aluminum substrate (1×50×150 mm, manufactured by Paltec Test Panels Co., Ltd.), and an adhesion test was performed in the manner described below.

Specifically, each of the above substrates to which a test coating material had been applied was subjected to preliminary drying at 80° C. for 10 minutes, and was then baked at 400° C. for 10 minutes, thus obtaining a coating film having an average film thickness of 10 μm across 5 locations. Cuts ware then formed in this coating film to generate 1 mm squares in a 10×10 grid pattern, portions of an adhesive tape (manufactured by Nichiban Co., Ltd.) were adhered to, and then peeled from, the surface 5 times, and the number of remaining squares was counted.

The test results are shown in Table 1.

TABLE 1

| | Item | Example 1 | Example 2 | Example 3 | Comparative Example 1 | Comparative Example 2 |
|---|---|---|---|---|---|---|
| Polyamideimide resin | Polymerization solvent | 3-methoxy-N,N-dimethylpropanamide | | | N-formyl morpholine | γ-butyro lactone |
| | Number average molecular weight | 15,000 | 10,000 | 25,000 | 17,000 | 8,000 |
| | Acid value (mgKOH/g) | 45 | 50 | 25 | 40 | 60 |
| Water | Relative to solvent ratio (% by mass) | 50 | 40 | 55 | 50 | 30 |

TABLE 1-continued

| Item | | Example 1 | Example 2 | Example 3 | Comparative Example 1 | Comparative Example 2 |
|---|---|---|---|---|---|---|
| Evaluation results | External appearance after storage at 60° C. for 7 days | transparent | transparent | transparent | cloudy | cloudy |
| | Adhesion | 100 | 100 | 100 | 100 | 0 |

As shown in Table 1, the polyamideimide resin compositions obtained in the examples exhibited excellent storage stability compared with the polyamideimide resin compositions of the comparative examples that used other polymerization solvents. Further, by using 3-methoxy-N,N-dimethylpropanamide as the coating material solvent, polyamideimide resin coating films having excellent adhesion were able to be formed.

The invention claimed is:

1. A polyamideimide resin composition comprising: (A) a polyamideimide resin, (B) a 3-alkoxy-N,N-dimethylpropanamide, (C) water, and a basic compound,
    wherein the polyamideimide resin composition excludes N-formylmorpholine,
    an acid value of the polyamideimide resin (A), composed of a combination of carboxyl groups and other carboxyl groups formed as a result of ring-opening of acid anhydride groups, is within a range from 10 to 80 mgKOH/g, and
    the basic compound is included in an amount of 2.5 to 10 equivalents, relative to the acid value of the polyamideimide resin (A).

2. The polyamideimide resin composition according to claim 1, wherein a number average molecular weight of the polyamideimide resin (A) is within a range from 5,000 to 50,000.

3. The polyamideimide resin composition according to claim 1, wherein an amount of the water (C) is at least 10% by mass of the composition.

* * * * *